(12) United States Patent
Tollenaere

(10) Patent No.: US 9,027,976 B1
(45) Date of Patent: May 12, 2015

(54) MULTI-PURPOSE TACTICAL PENDANT HOOK

(71) Applicant: Donald John Tollenaere, Seneca, SC (US)

(72) Inventor: Donald John Tollenaere, Seneca, SC (US)

( * ) Notice: Subject to any disclaimer, the term of this patent is extended or adjusted under 35 U.S.C. 154(b) by 0 days.

(21) Appl. No.: 14/303,151

(22) Filed: Jun. 12, 2014

(51) Int. Cl.
| | |
|---|---|
| B66C 1/34 | (2006.01) |
| B66C 1/38 | (2006.01) |
| B64D 1/12 | (2006.01) |
| B64D 1/22 | (2006.01) |
| B64C 27/04 | (2006.01) |
| B64D 9/00 | (2006.01) |

(52) U.S. Cl.
CPC . *B64D 1/22* (2013.01); *B64C 27/04* (2013.01); *B64D 9/00* (2013.01)

(58) Field of Classification Search
USPC ............. 294/82.3, 82.24, 74, 75, 82.1, 82.17, 294/82.2, 82.22, 83.31, 82.32, 82.33; 344/37.1; 244/118.1, 137.1, 137.4; 182/142, 144, 148
See application file for complete search history.

(56) References Cited

U.S. PATENT DOCUMENTS

| | | | | |
|---|---|---|---|---|
| 3,032,365 | A * | 5/1962 | Campbell ................... | 294/82.32 |
| 3,838,836 | A * | 10/1974 | Asseo et al. ................ | 244/137.4 |
| 3,904,156 | A * | 9/1975 | Smith ......................... | 244/118.1 |
| 4,027,838 | A * | 6/1977 | Barnum et al. ............. | 244/17.11 |
| 4,124,181 | A | 11/1978 | Kolwey | |
| 4,185,864 | A * | 1/1980 | Phillips et al. ............... | 294/82.3 |
| 4,422,528 | A * | 12/1983 | Patterson ...................... | 182/145 |
| 4,441,750 | A * | 4/1984 | Reber ......................... | 294/82.24 |
| 5,494,240 | A | 2/1996 | Waugh | |
| 5,593,113 | A * | 1/1997 | Cox ........................... | 294/81.56 |
| 6,189,834 | B1 | 2/2001 | Dietz et al. | |
| 8,172,184 | B2 * | 5/2012 | Spencer et al. ............. | 294/82.24 |
| D676,625 | S * | 2/2013 | Tollenaere ..................... | D34/35 |
| 8,532,846 | B2 * | 9/2013 | Tollenaere et al. ............... | 701/3 |
| 8,534,607 | B2 | 9/2013 | Tardiff et al. | |
| 8,544,912 | B1 * | 10/2013 | Matthews ....................... | 294/74 |
| 2013/0054054 | A1 * | 2/2013 | Tollenaere et al. ............... | 701/3 |

* cited by examiner

*Primary Examiner* — Paul T Chin

(74) *Attorney, Agent, or Firm* — Raymond L Greene

(57) ABSTRACT

A multi-purpose helicopter pendant hook assembly is provided. The pendant hook assembly allows cargo load attachment by a ground crewman from positions either on the load itself or standing on the ground next to the load. In both cases, a stand-off from the helicopter improves safety for the ground crewmen. The hook assembly combines the capability to pick up cargo and personnel, or both, simultaneously. This multi-purpose feature reduces the need for more than one helicopter during recovery operations. The pendant has multiple D-rings for attachment of personnel and has a communications link for ground crew to pilot communications. The hook assembly also has a flange and hook configuration which allows release of the cargo load while retaining the cargo net.

2 Claims, 8 Drawing Sheets

US 9,027,976 B1

MULTI-PURPOSE TACTICAL PENDANT HOOK

FEDERALLY SPONSORED RESEARCH OR DEVELOPMENT

Not Applicable

FIELD OF THE INVENTION

The present invention relates to helicopter sling hooks and more particularly to pendant hooks allowing simultaneous pick-up of ground crew and cargo loads.

BACKGROUND OF THE INVENTION

Current pick-up of payloads by helicopter using an airframe-mounted hook on the helicopter requires the attachment points of a cargo net or other suspension gear to be connected directly to the airframe-mounted hook. In order to accomplish this connection, it is necessary for the helicopter pilot to position the helicopter in a relatively precise location, both longitudinally and laterally, and also maintain a precise hover altitude. This hover altitude is typically five or six feet above the cargo load. From this position, a crewman standing on the cargo load must connect the load suspension gear to the helicopter hook mounted on thr belly of the helicopter. Several problems occur with this crew-cargo arrangement. First, very little slack is afforded so that the crewman can compensate for position errors of the helicopter. As a result, sometimes extended communications between the crewman and the pilot are required resulting in slow or delayed hook-up times. The hook-up times can be particularly troublesome during operations with night vision goggles. Additional difficulties can occur where the crewman attempting to hook up the load is positioned too close to the helicopter landing gear, potentially being struck or knocked off the load by movement of the helicopter.

Also, there is no safe method of extracting the crewman without having a second helicopter to provide a personnel pick-up. It is generally unsafe to attempt to ride under the helicopter standing on the cargo load.

What is needed is a helicopter hook assembly which allows positioning of the ground crew during load hook-up either on the load or on the ground beside the load. Additionally, the hook assembly should allow rapid hook-up including hook-up during low visibility or night operations, including during use of night vision goggles.

BRIEF SUMMARY OF THE INVENTION

It is an object of the invention to provide a helicopter pendant hook having a multi-payload pick-up capability.

It is a further object of the invention to provide a helicopter pendant hook having a personnel pick-up structure.

It is another object of the invention to provide a helicopter pendant hook having a cargo pick-up structure adapted to releasing cargo while retaining a cargo net.

It is yet another object of the invention to provide a helicopter pendant hook providing ground crew work space clear of the helicopter undercarriage.

It is yet another object of the invention to provide a helicopter pendant hook adapted for cargo attachment with the ground crew located on the ground next to the cargo load.

The present invention is a multi-purpose helicopter pendant hook providing both cargo and personnel pick up simultaneously. Personnel can be connected directly to the pendant while standing on the frame of the hook. Additionally, injured personnel can be attached to the pendant even when secured in a stretcher. The pendant hook allows cargo load attachment by a ground crewman from positions either on the load itself or standing on the ground next to the load. In both cases, a stand-off from the helicopter improves safety for the ground crewmen. The hook combines the capability to pick up cargo or personnel, or both simultaneously. This multi-purpose feature reduces the need for more than one helicopter during recovery operations. The pendant has multiple D-rings for attachment of personnel and has a communications link for ground crew to pilot communications. Communications from the helicopter crew to the crewman at the hook location is provided by hardwire or wireless interface. The hook also has a flange and hook configuration which allows release of the cargo load while retaining the cargo net.

BRIEF DESCRIPTION OF THE DRAWINGS

The above and numerous other objects of the invention that may be achieved by the preferred embodiment of the invention will be more readily understood from the following detailed description and the appended drawings wherein:

FIG. 2a shows a cross-section of the pendant.

DETAILED DESCRIPTION OF THE INVENTION

Figure 1:
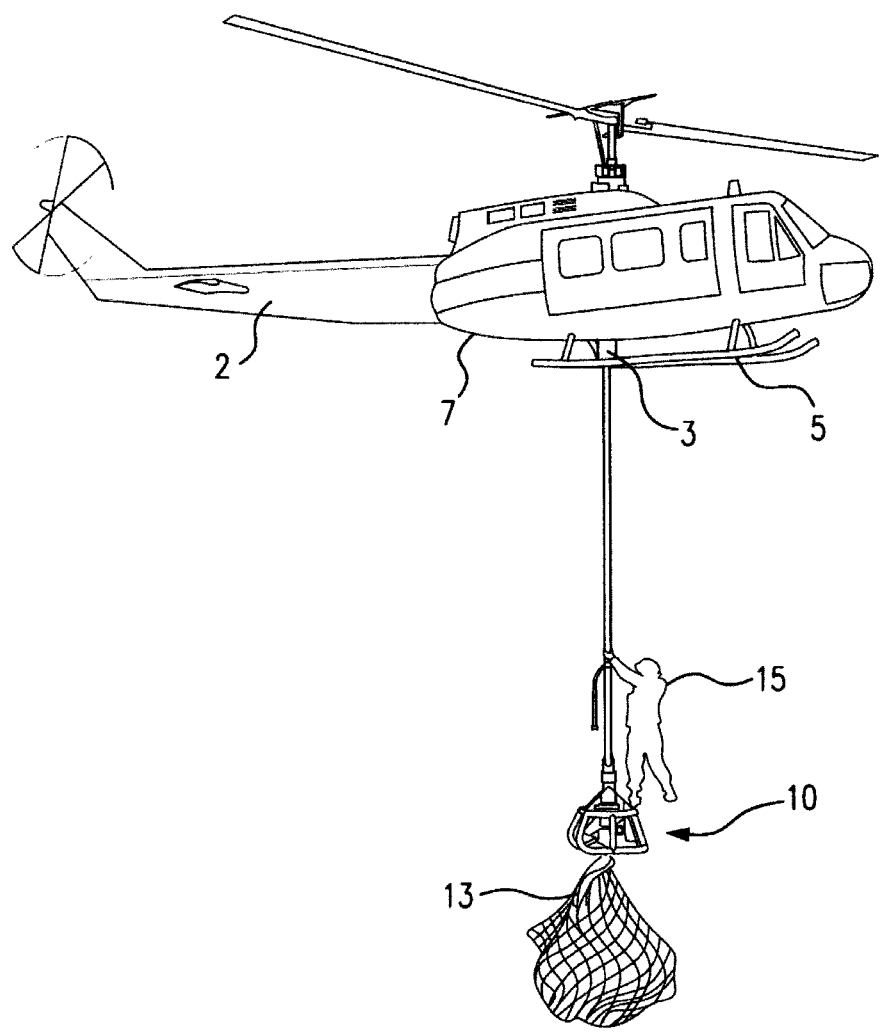
FIG. 1 is a perspective view of the invention showing the multi-purpose pendant hook attached to a fuselage-mounted helicopter hook and carrying both cargo and a crewman.

Referring now to FIG. 1, the helicopter multi-purpose tactical pendant hook assembly of the present invention, designated generally by the reference numeral 10, is shown in a representative load configuration. The helicopter multi-purpose tactical pendant hook assembly 10 is attached to a representative helicopter having a fuselage 2, a lower fuselage 7, a helicopter-mounted hook 3 attached to the lower fuselage, and landing gear 5. A crewman 15 is attached to the pendant 21 (shown in FIG. 2) and standing on the hook assembly. The hook assembly is simultaneously lifting a cargo contained in a rigging or net 13.

Figure 2:
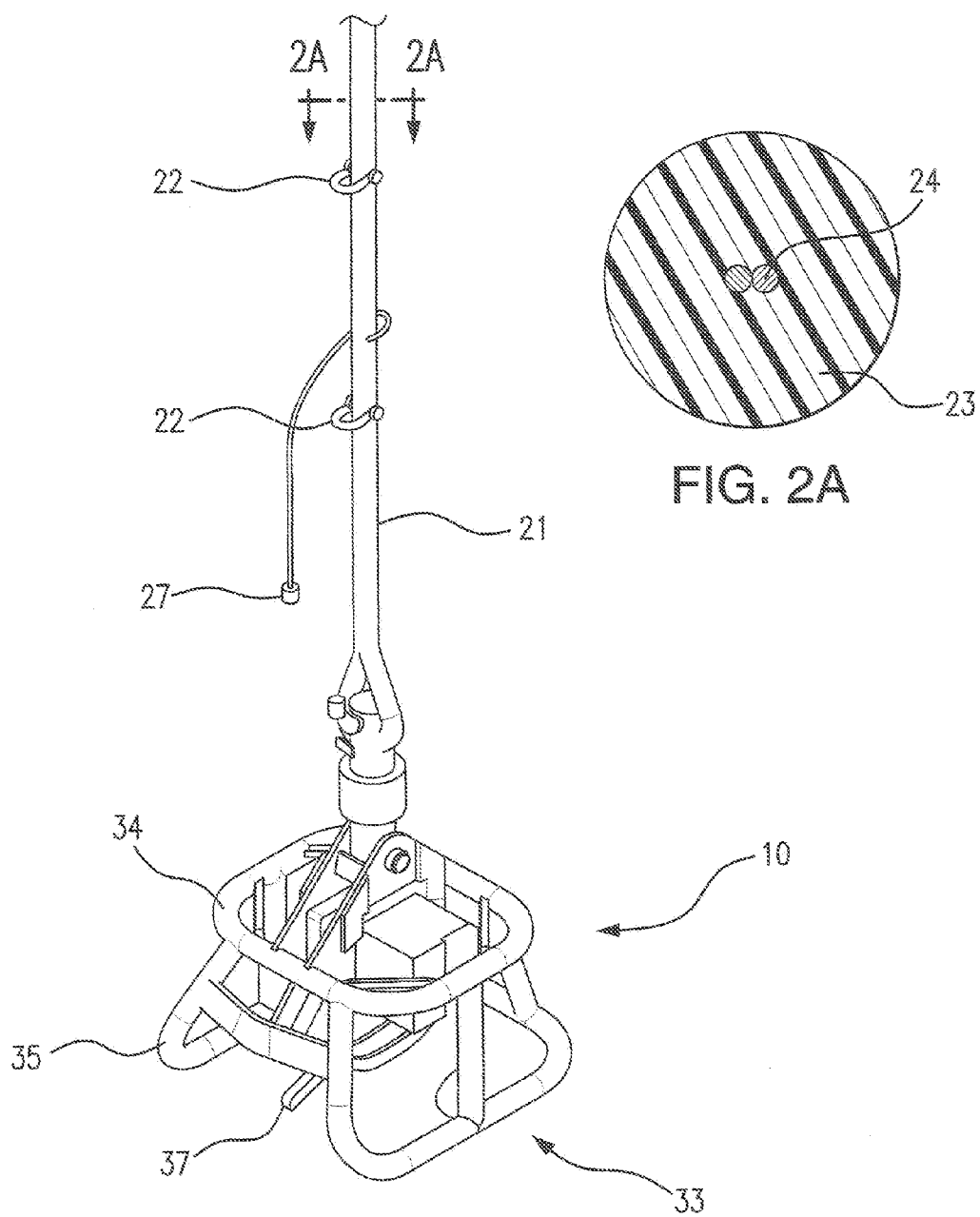
FIG. 2 is a perspective view of the Multi-purpose pendant hook showing the major components.
Figure 3:
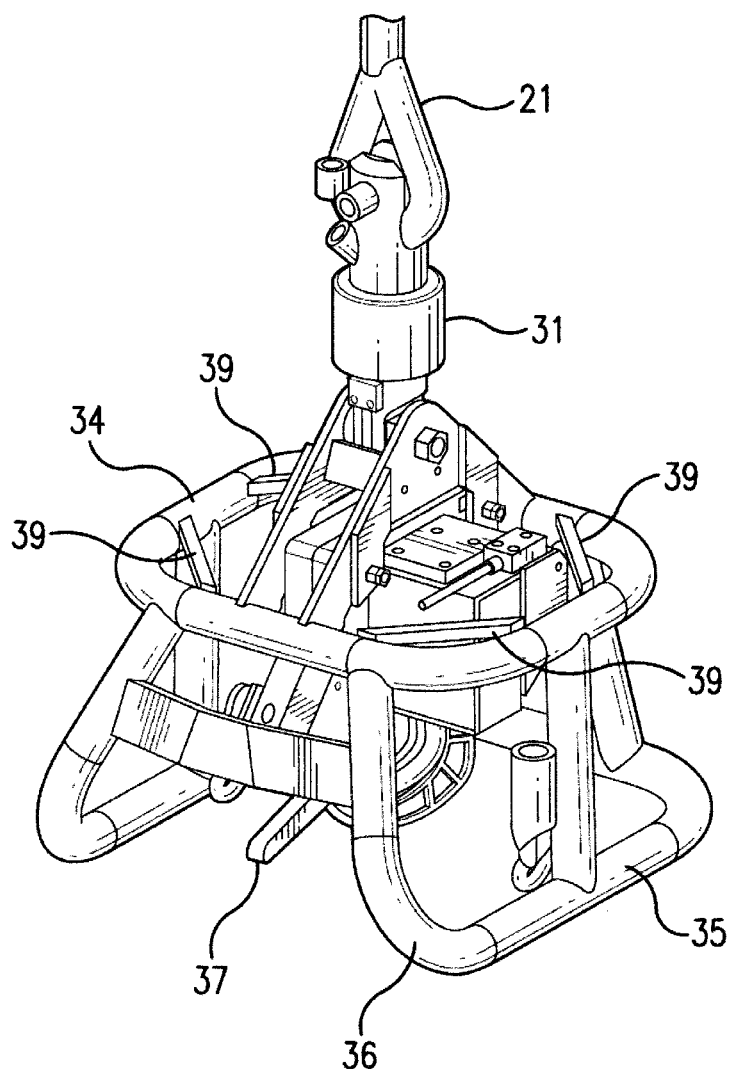
FIG. 3 is a perspective view of the hook assembly showing individual elements of the assembly.

Referring now to FIG. 2, the multi-purpose tactical pendant hook assembly 10 is shown with its associated components. The system includes a pendant 21 comprising a synthetic line 23 with a plurality of electric lines 24 within the synthetic line which attaches to the helicopter-mounted hook 3 (shown in FIG. 1). The pendant 21 has a plurality of embedded D-rings 22 attached along the pendant 21 above the hook assembly 10. These D-rings 22 allow a ground crewman to secure himself to the pendant while standing on the hook assembly. An intercom cord 27 provides communication with crew members inside the helicopter shown in FIG. 1. Several crewmen can be lifted at one time. The hook assembly has an overall frame assembly 33 surrounding the electrically-operated hook load beam 37. The upper frame 34 and the lower frame 35 have additional elements attached as shown in FIG. 3. The configuration of the synthetic line 23 and electrical lines 24 can be seen in cross-section view FIG. 2A.

FIG. 3 shows the pendant hook assembly with the individual elements. A swivel 31 connects the hook assembly to the pendant 21 thereby avoiding twisting damage which can occur where a load is connected directly to a fuselage mounted hook. The upper frame tube 34 provides protection for the hook assembly and provides a platform for crewman steps 39 located at the corners of the frame. The lower frame 35 is extended on the forward tube 36 thereby providing additional steps for crewman. Up to four crewmen can be carried above a cargo load, two on the lower frames and two on the upper frames.

Figure 4:
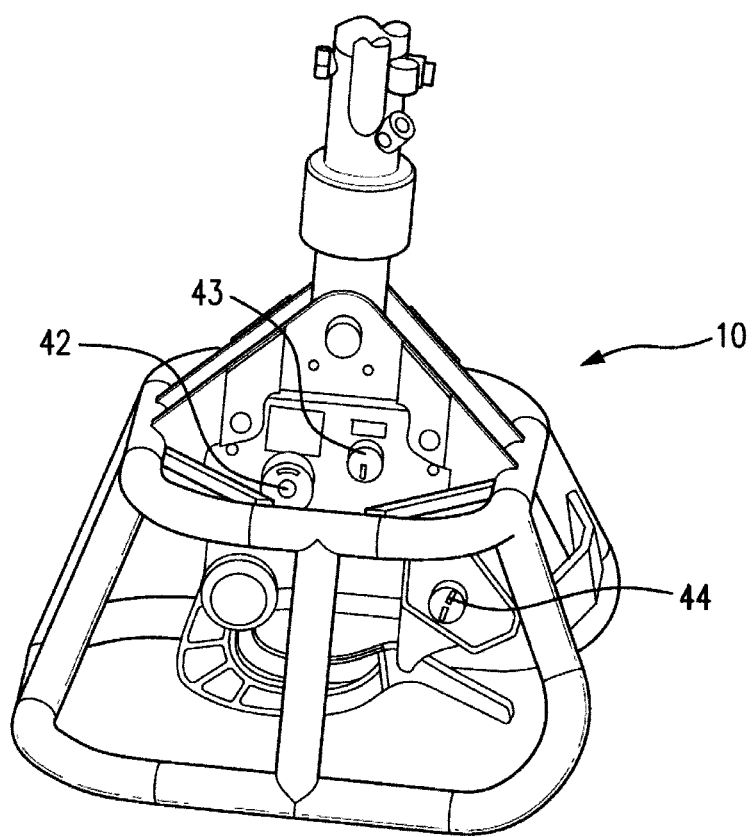
FIG. 4 is a perspective view of the hook assembly showing release and safety mechanisms.

FIG. 4 depicts certain safety features on the pendant hook assembly 10. Electrically operated hook release 42 is operated from the helicopter using the embedded electrical line 24 in the pendant or, alternately, by wireless operation. This release can also be operated manually by a crewmember. In the event of carrying non-releasable cargo, such as personnel in a basket attached to the hook, a load beam safety 43 prevents load release. A further safety, keeper safety lockout 44, eliminates the possibility of unintended release. Release of a basket in this configuration can be accomplished by a crewman manually unlocking safety 43. Thereafter, release 42 may be either manually operated or electrically operated in order to release a basket load.

Figure 5:
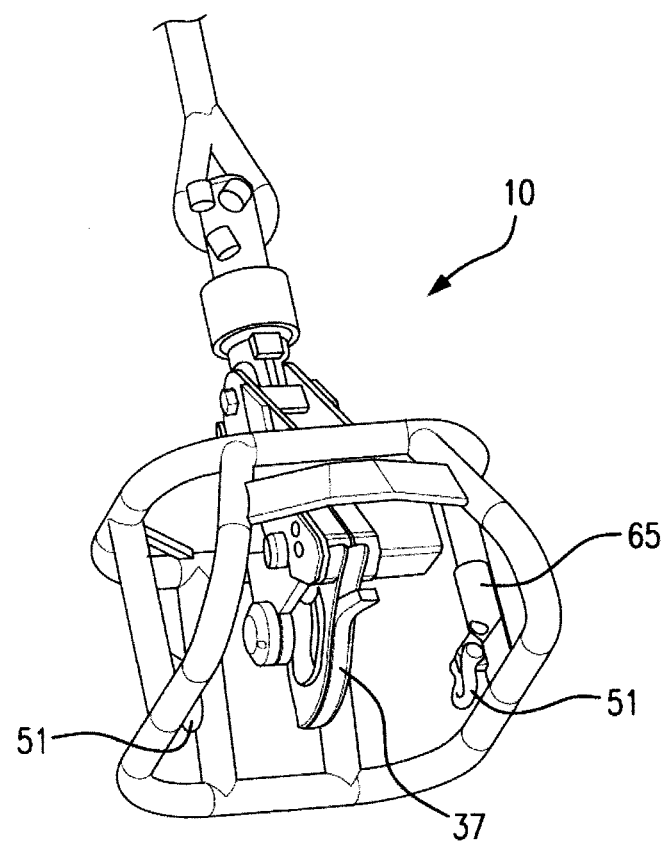
FIG. 5 is a perspective view of the bottom of hook assembly showing cargo rigging attachment flanges.

Referring now to FIG. 5, a perspective view of the bottom of hook assembly 10 is shown with the mounting flanges 51 for alternate, that is permanent, attachment of one side of cargo netting or rigging. In this configuration, one side of a cargo net is attached to flanges 51 and the other side is attached to hook load beam 37.

Figure 6:
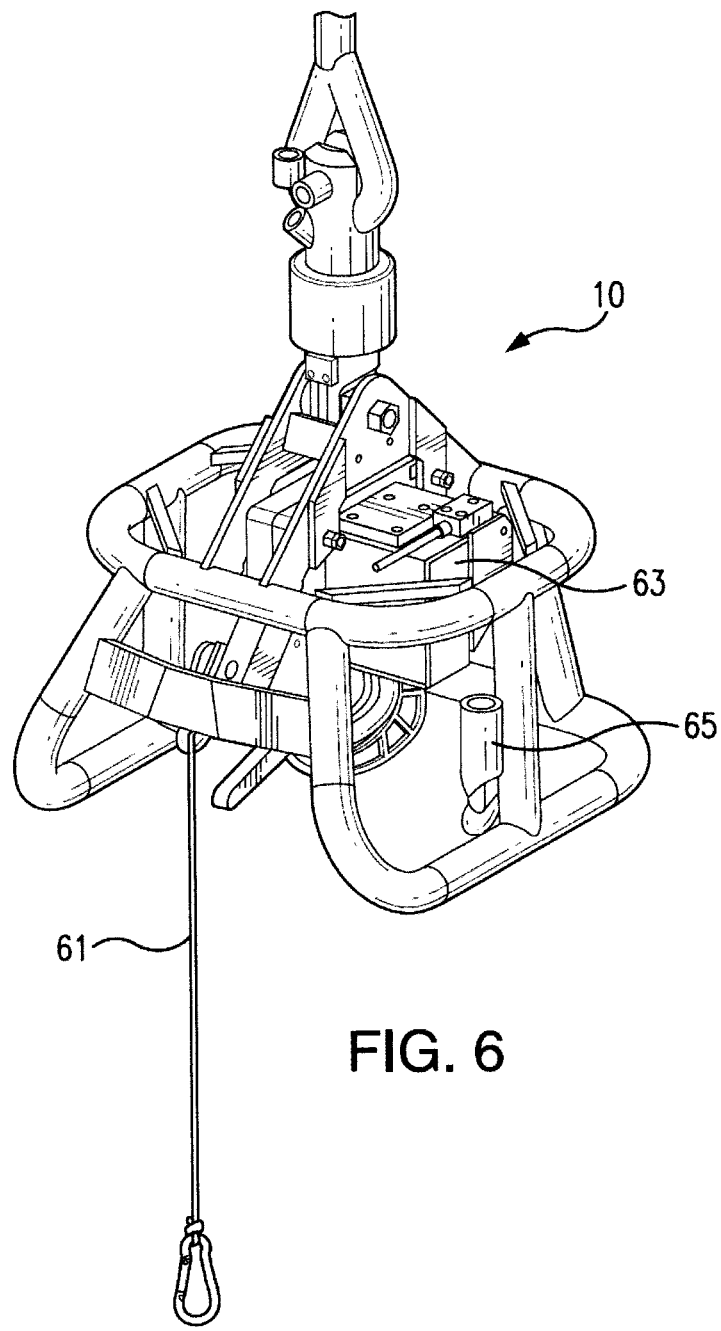
FIG. 6 is a perspective view of the hook assembly showing a static discharge cable.

Referring to FIG. 6, the reverse side of hook assembly 10 is shown with various components. A static discharge cable 61 is shown with the discharge end secured to a flange with a carbineer. Accessory box 63 contains electronic components for operation the hook release solenoid and wireless components and a battery for operation of wireless components which also provides a secondary source of power for operation of the hook release. A wireless camera 65 allows the crew inside the helicopter to observe the security and motion of the load and also allows more precise placement during delivery.

OPERATION OF THE INVENTION

Figure 7:
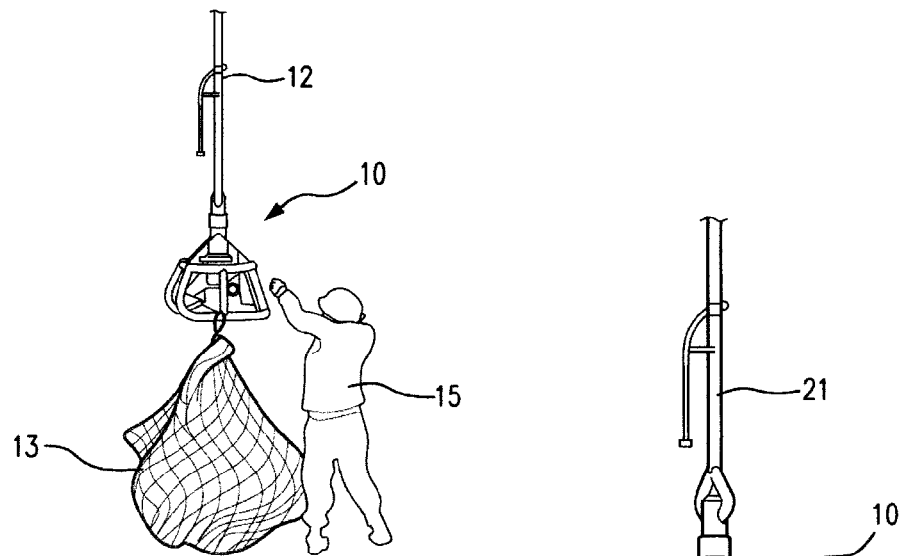
FIG. 7 shows a ground crewman attaching a loaded net to the hook while standing on the adjacent ground.

FIG. 7 is a perspective view a ground crewman 15 attaching the multi-purpose tactical pendant hook assembly 10 to the cargo load in net 13 while standing on the ground adjacent to the load. During this hook up, the helicopter does not need to hover precisely over the load as in the fuselage hook situation. The helicopter need only hover near the load at a height sufficiently low to provide slack in the pendant 21. The ground crewman 15 can then move the hook assembly to the load in net 13 and attach it. This capability greatly speeds up load connection by reducing the maneuvering required by the helicopter.

Figure 8:
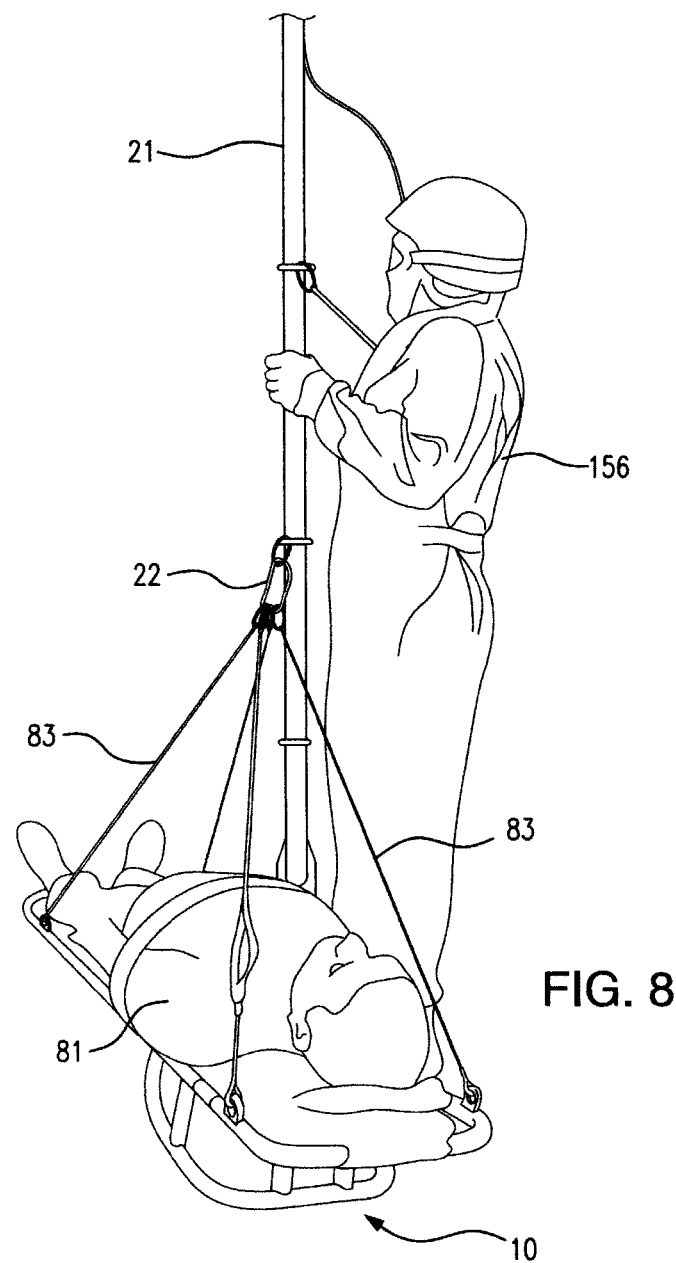
FIG. 8 is a perspective view of the hook and pendant showing the securing of a stretcher and injured crewman for lifting.

Referring to FIG. 8, an injured person 81 on a stretcher may be transported using the multi-purpose tactical pendant hook assembly 10. For this operation the pendant 21 is slacked sufficiently to allow the stretcher to be secured to the D-rings 22 using straps 83. Once the injured person is secured, a crewman can simultaneously be lifted as previously described. Similarly, a cargo load can also be simultaneously lifted.

Figure 9:
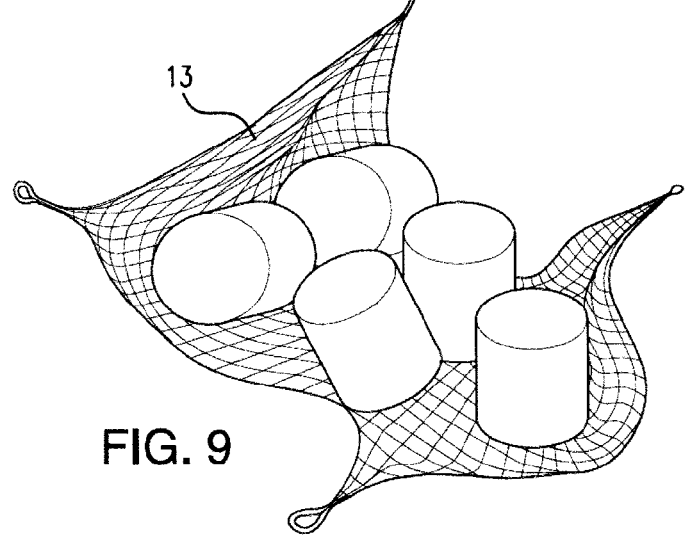
FIG. 9 is a perspective view of the hook assembly releasing a cargo while retaining the cargo net.

Referring to FIG. 9, the load may be released while retaining the cargo net or rigging. In order to retain the cargo net or rigging, one side of the net or rigging is secured to the flanges 51 on the lower frame of the hook assembly 10. The other side of the net or rigging is attached to hook load beam 37. When the hook load beam 37 is released the cargo is discharged, but the net or rigging is retained for pick up of another load.

The features and advantages of the invention are numerous. The main feature is the ability to simultaneously pick up both personnel and cargo. However, the pendant hook assembly also provides a safer work zone under the helicopter by keeping the ground crew clear of the helicopter fuselage and landing gear. The ground crew may position themselves on the load or adjacent to the load on the ground. Faster hook-ups are possible since the ground crew member can bring the hook and the load rigging together without requiring precise positioning of the hovering helicopter. During the use of night-vision goggles, the decrease in hook-up time is dramatic. Also, the function of operating the multi-purpose hook assembly from inside the helicopter, as is now the case with fuselage-mounted hooks, is retained via wireless or wired operation.

Many variations will be apparent to those skilled in the art. For example, various different personnel attachment rings can be used, various wireless or wired communications methods (or no electronic devices, relying instead on hand or light signals) between the ground crew and the aircrew can be used within the scope of the invention. Additionally, several variations of the hook-flange arrangement and the foot platforms on the hook assembly frame will be within the scope of the invention.

What is claimed is:

1. A helicopter multi-purpose tactical hook assembly system comprising:
    a pendant with an upper end for attachment to a fuselage-mounted hook;
    said pendant further comprising an assembly of a synthetic line and electric lines;
    a plurality of D-rings attached along the length of the pendant;
    a swivel connected to the lower end of said pendant;
    a multi-purpose hook assembly attached to said swivel;
    said multi-purpose hook assembly with a hook frame having upper and lower frame tubes supporting and enclosing an electrically operated hook, said hook connected to the electric lines within the pendant;
    said hook frame having a plurality of flanges, adapted to engage cargo net rigging, attached to the lower frame tubes;
    a static electricity discharge line attached to the lower frame tubes; and
    a plurality of foot platforms attached to the upper frame tubes wherein said platforms can lift a stretcher and injured crewman.

2. A helicopter multi-purpose tactical hook assembly system comprising:
    a pendant with an upper end for attachment to a fuselage-mounted hook;
    said pendant further comprising a synthetic line;
    a plurality of D-rings attached along the length of the pendant;
    a swivel connected to the lower end of said pendant;
    a multi-purpose hook assembly attached to said swivel;

said multi-purpose hook assembly having a hook frame having upper and lower frame tubes and supporting and enclosing a wirelessly-operated electrical hook;
said hook frame having a plurality of flanges, adapted to engage cargo net rigging, attached to the lower frame tubes;
static electricity discharge lines attached to the lower frame tubes; and
a plurality of foot platforms attached to the upper wherein said platforms can lift a stretcher and injured crewman.

\* \* \* \* \*